US011039602B2

(12) United States Patent
Catena (10) Patent No.: US 11,039,602 B2
(45) Date of Patent: Jun. 22, 2021

(54) EXTENSIBLE LEASH FOR DOGS AND OTHER PETS

(71) Applicant: PRIMENOVE S.R.L., Pescara (IT)

(72) Inventor: Rocco Catena, Pescara (IT)

(73) Assignee: EXBUR HOLDING LTD., Aberdeen (GB)

( * ) Notice: Subject to any disclaimer, the term of this patent is extended or adjusted under 35 U.S.C. 154(b) by 93 days.

(21) Appl. No.: 16/304,291

(22) PCT Filed: May 25, 2017

(86) PCT No.: PCT/IB2017/053075
§ 371 (c)(1),
(2) Date: Nov. 25, 2018

(87) PCT Pub. No.: WO2017/203455
PCT Pub. Date: Nov. 30, 2017

(65) Prior Publication Data
US 2019/0082658 A1    Mar. 21, 2019

(30) Foreign Application Priority Data

May 25, 2016   (IT) .................. 102016000054031
May 25, 2016   (IT) .................. 102016000054034

(51) Int. Cl.
*A01K 27/00*   (2006.01)
*B65H 75/44*   (2006.01)
(52) U.S. Cl.
CPC ........ *A01K 27/004* (2013.01); *B65H 75/4431* (2013.01); *B65H 2701/35* (2013.01)

(58) Field of Classification Search
CPC ..... A01K 27/00; A01K 27/003; A01K 27/004
See application file for complete search history.

(56) References Cited

U.S. PATENT DOCUMENTS 2,799,245 A * 7/1957 Ruggiero ............. A01K 27/001
119/794
2,866,436 A * 12/1958 Swain ................. A01K 27/004
119/797
(Continued)

FOREIGN PATENT DOCUMENTS

DE   202017003035 U1 * 7/2017 ............. A01K 27/00
EP       2095708 A2 * 9/2009 ........... A01K 27/004
GB       2481403    * 12/2011

*Primary Examiner* — Monica L Barlow
*Assistant Examiner* — Aaron M Rodziwicz
(74) *Attorney, Agent, or Firm* — Mark M. Friedman (57) ABSTRACT

An extensible leash for pets comprises a shell (1, 101) provided with a handle (1, 102), a cable-winding roll (3, 103) provided with a cable (6, 22) with an end integral with the roll (3, 103) and a free end external to the shell (1, 101). The roll (3, 103) is rotatable around a rotation axis as a result of the action of a spiral-shaped spring (5, 105) Means for locking/unlocking the roll are provided with a control mechanism operated by a first lever (2, 106) to be operated by the palm of the hand to move from an unlocking position to a locking position of the roll (3, 103). The first lever (2, 106) is associated with a bi-stable locking device (11, 107) adapted to hold the first lever locked in the two positions and to allow it to move from the locking position to the unlocking position.

13 Claims, 9 Drawing Sheets

(56) References Cited

U.S. PATENT DOCUMENTS

| | | | | |
|---|---|---|---|---|
| D448,892 S | * | 10/2001 | Hans | A01K 27/004 |
| | | | | D30/153 |
| 2008/0105214 A1 | * | 5/2008 | Moulton | A01K 27/004 |
| | | | | 119/796 |
| 2010/0043721 A1 | * | 2/2010 | Cigan | A01K 5/0114 |
| | | | | 119/796 |
| 2011/0083617 A1 | * | 4/2011 | Townsend | A01K 1/04 |
| | | | | 119/797 |
| 2011/0180017 A1 | * | 7/2011 | Goldenberg | B65H 75/4431 |
| | | | | 119/796 |
| 2011/0197820 A1 | * | 8/2011 | Goldy | A01K 27/006 |
| | | | | 119/61.5 |
| 2013/0008392 A1 | * | 1/2013 | Holmstrom | B25G 1/06 |
| | | | | 119/796 |
| 2014/0360440 A1 | * | 12/2014 | Fox | A01K 27/004 |
| | | | | 119/796 |
| 2015/0128879 A1 | * | 5/2015 | Anderson | A01K 27/004 |
| | | | | 119/796 |

* cited by examiner

EXTENSIBLE LEASH FOR DOGS AND OTHER PETS

TECHNICAL FIELD

This invention finds its application in the technical field of articles for animals and its object is an extensible leash for dogs and other pets equipped with a cable of adjustable length.

STATE OF THE ART

As known, the so-called extendable leashes today on the market comprise a cable which is connected to an end to the collar of the animal through a coupling device, usually a snap-hook, while to the other end it is rewound inside a bodywork or shell on a specific cable-winding roll.

Such leashes are also provided with a mechanism for releasing and progressive rewinding of the cable connecting to the animal which allow the progressive and voluntary release of the cable by the owner, thanks to which the animal has a wide degree of freedom, having the possibility to walk away from the owner up to the maximum length of the cable, adjustable according to the model.

The mechanism of releasing and rewinding is generally equipped with a blocking device of the cable at the desired length.

Such leashes are generally characterized by a shell, which houses both the cable-winding roll provided with a flat spiral spring for the winding of the cable and the locking/unlocking device of the cord-winding roll, and a handle on which one or two blocking buttons of the control mechanism of the roll are arranged.

The cable is wounded on the external diameter of the roll thanks to the action of the spiral spring, arranged in a housing obtained on the inner diameter of the cable-winding roll, rotatable both in the clockwise direction and in the counterclockwise one to unroll or to rewind the cable, or vice versa.

The possibility of rotating is controlled in the unrolling direction by the pulling force of the animal and in the rewinding direction of the cable on the roll by the spiral spring which is charged during the unrolling of the cable by the pulling force exerted by the animal.

In such leashes, the winding roll can be locked, temporarily or permanently, in any angle of rotation, through a mechanical locking device controlled exclusively by the thumb of the hand.

In all the leashes the roll on which the cable is rewound is pivoted and protected by a roll-holder shell, strictly fastened and integral with the handle.

WO2011058588, on behalf of the same applicant, discloses instead a leash wherein the roll-holder shell is integral with the handle but not strictly fastened, being free to rotate around the axis on which the handle is hinged.

All the known extendable leashes have the characteristic of having as an element for locking the roll, a mechanical system controlled by the thumb. Moreover, in these leashes the spiral spring is arranged in an appropriate seat inside the cable-winding roll. However, the need to use the thumb of the hand to operate the locking/unlocking of the cable-winding roll is in itself a factor which can limit the use thereof by those owners who do not have the possibility to use the thumb, for example due to diseases such as the syndrome of the carpal tunnel, rheumatoid arthritis or limb mutilation.

Moreover, also for those who can use the thumb, the need to use it frequently, rapidly causes muscle fatigue and consequent reduction of reflexes and arising of muscular pain.

Finally, the use of the thumb can be limited, especially in women, by the length of the nail.

Furthermore, the locking system operated by the thumb of the hand presents a further drawback due to the intervention times in case of danger. In fact, with the extendable leashes, whose length in certain cases can reach 7 meters, the reflexes delayed by the tiredness and the related longer intervention times play an important role on the functionality and safety of the device, with consequent risk for the animal or for the surrounding environment due to the reaction and locking times not short enough to limit the run of the animal.

Another limiting factor is represented by the distance of the centre of gravity of the weight of the leash from the handle. Considered that the medium weight of a leash for medium dogs is about 0.550 kilos, and considered that while you walk a dog your arm is more or less always outstretched, you can see that a weight located at the end of the limb, with the passing of time, can cause a tiredness which increases with the distance of the weight from the handle.

Another element not to underestimate when you consider the limits of the extendable leashes currently on the market, is the danger of the fast return of the cable which, in its final area, has a snap-hook attached to the collar of the animal. In fact, it is quite usual incidents of accidents for the people caused by the stroke received by the snap-hook as a result of the dynamic action due to the fast and uncontrolled return of the cable subject to the recall action exerted by the roll housed in the shell of the leash.

Such a dangerous action can be hardly avoided without the risk of precluding a correct functioning of the leash especially during the recall and winding of the cable on the winding roll. Some manufacturers of extendable leashes have overcome this problem offering a little safety collar whose use, anyway, does not protect the leash from the danger above mentioned.

Scope of the Invention

An object of the present invention is to remove the above mentioned drawbacks and disadvantages of the leashes creating an extensible leash provided with high efficiency and increased functional comfort and use.

A particular object is to provide an extensible leash which eliminates the use of the thumb to operate the control system of the locking of the cable-winding roll.

Another object is to make available an extensible leash even safer in its functioning and in particular as regard to the dangerous fast return of the cable caused by a sudden and involuntary release of the hooking system to the collar of the animal.

Another object is to provide an extensible leash wherein there is the possibility to lock the flowing of the cable independently from the locking system operated by the palm or the fingers of the hand.

Another object is to realize a leash which allows the owner to have the hands free and to hold the leash with the forearm without using the hands.

A further object is to provide an extensible leash of simple and compact shape to have the centre of gravity whose weight is more or less the same of the handle as regards other leashes so to make the leash less tiring to hold.

Such object, as well as others which will become more apparent hereinafter, are reached by an extensiable leash which, according to claim 1, comprises a shell provided with a handle, a cable-winding roll housed in the shell and provided with a cable having one end integral with the roll and a free end external to the shell and coming out through an opening of the shell or handle to be hooked to a collar, a vest or any other item wearable by the animal, said roll being rotatable around a rotation axis as a result of the action of a spring wound as a spiral in the shell, locking/unlocking means of the roll provided with a control mechanism operated by a first lever located on the handle in such a position to be operated through the palm of the hand to move from an unlocking position wherein the roll is free to rotate to a locking position of the roll and wherein the first lever is associated to a bi-stable locking device adapted to hold the first lever locked in the two positions and to allow the passage thereof from a locking position to an unlocking position and vice versa only with the pressure of the lever.

Thanks to this combination of features, the person using the leash, undergoing the pulling by the animal, will be inclined to hold the leash so to close the palm and operate the lever while the palm of the hand will be unloaded at its final part.

This action will be even less hard than the action carried out through the thumb as it is carried out by a stronger part of the body acting also on a wider surface taking advantage of the lever-effect.

The presence of a bi-stable device will avoid that the retreat of the lever causes the sudden unlocking of the cable, with consequent risk both for the animal and for people or things nearby.

According to a further aspect the leash will include a temporary locking device of the cable arranged at the opening of the shell or handle.

In particular, this temporary locking device may comprise a locking element susceptible to rotate due only to the rotation of said handle from a first position wherein the sliding of the cord is free to a second position wherein said locking element hold the cable to prevent from sliding.

This feature will allow to have a leash even safer in its functioning and to realize a protection for the owner as regard to the dangerous fast return of the cable due to a sudden and involuntary release of the hooking system to the collar of the animal. As matter of fact the above described dangerous situation is almost eliminated with the temporary locking device located at the mouth of the tape of the handle, as the balancing part of the lever operates as brake of the cable, reducing its return speed on the roll and the consequent impact.

Advantageous embodiments of the invention are obtained according to the dependent claims.

BRIEF DISCLOSURE OF THE DRAWINGS

Further features and advantages of the invention will become clearer in the light of the detailed description of some preferred but not exclusive embodiment of the leash according to the invention, shown as examples with the aid of the attached drawings wherein.

BEST MODES OF CARRYING OUT THE INVENTION

With reference to the attached figures some preferred but not exclusive embodiment of an extensible leash for dogs or other pets are shown.

Figure 1:
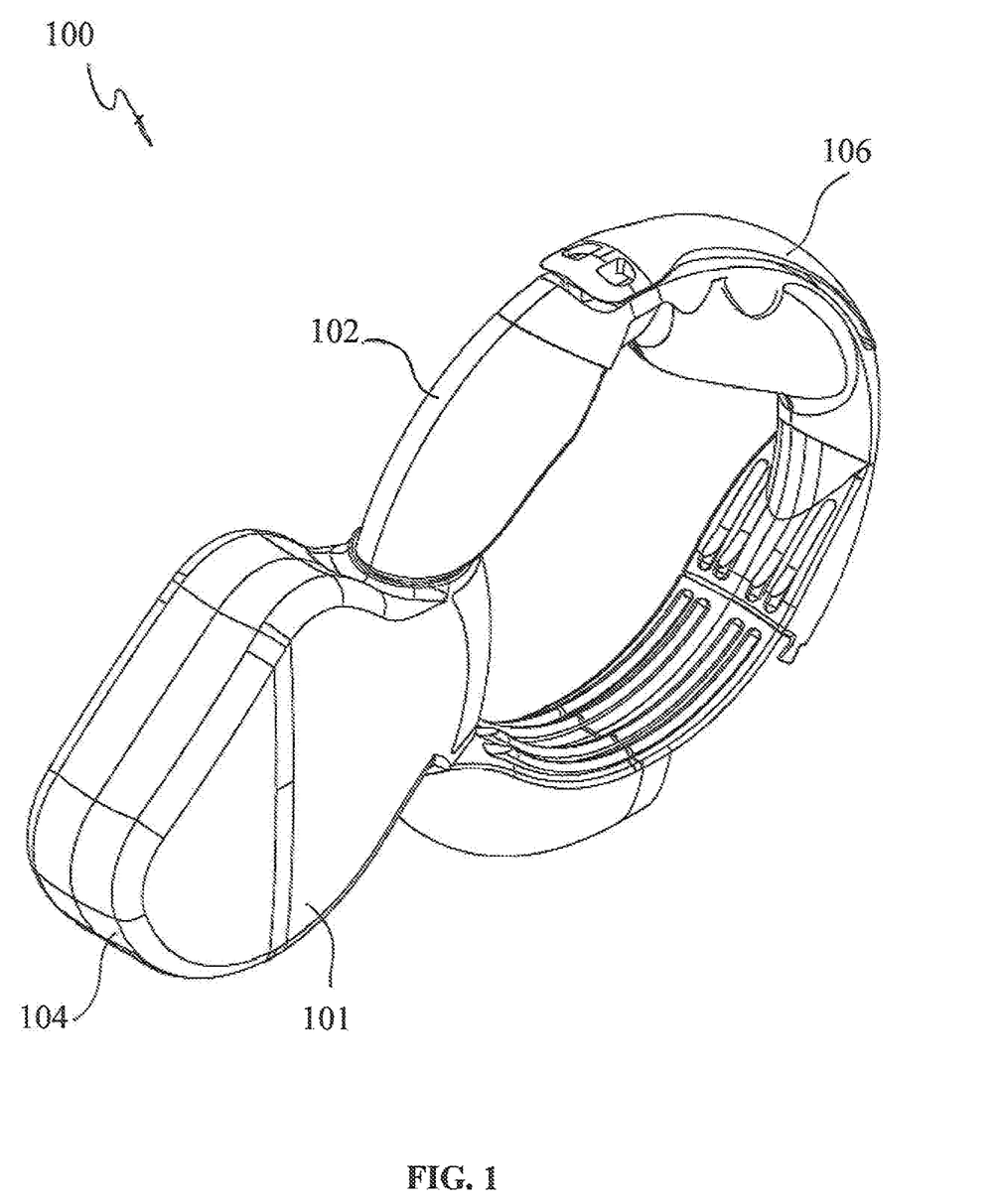
FIG. 1 is a perspective view of the leash in a first embodiment and an in the use condition.
Figure 2:
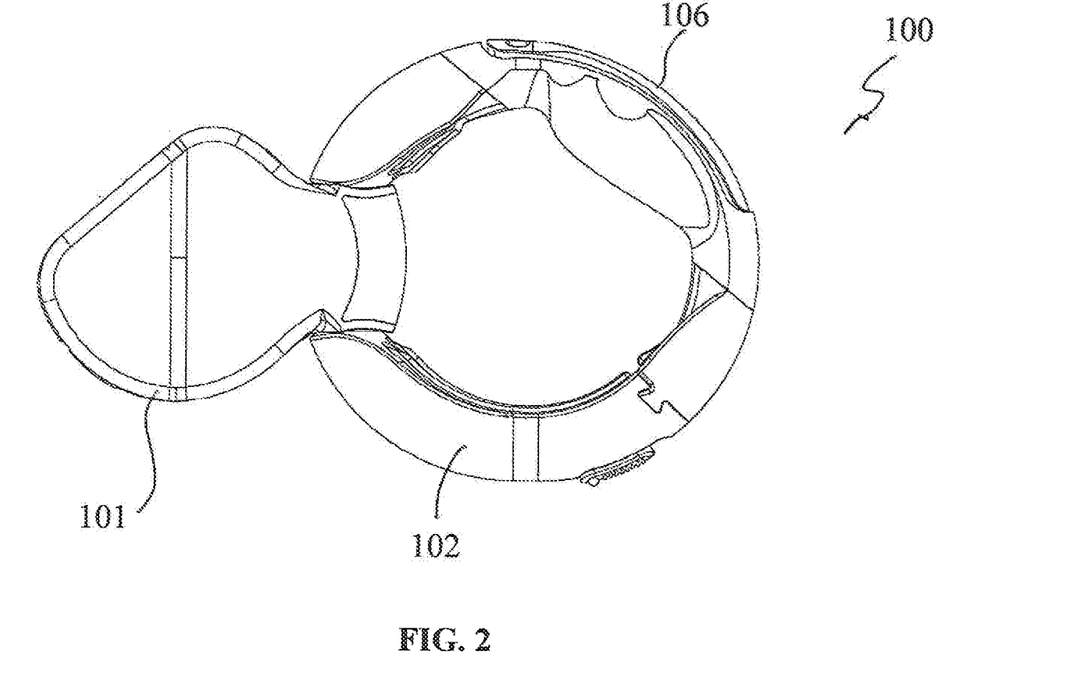
FIG. 2 is a front view of the leash of FIG. 1.

FIG. 1 shows a first embodiment of the leash, generally indicated with 100, which comprises a shell or bodywork 101 provided with a handle 102 of toroidal shape rotatably fixed to the shell 101 so that this latter can be rotated inside the central hole of the handle.

Figure 3:
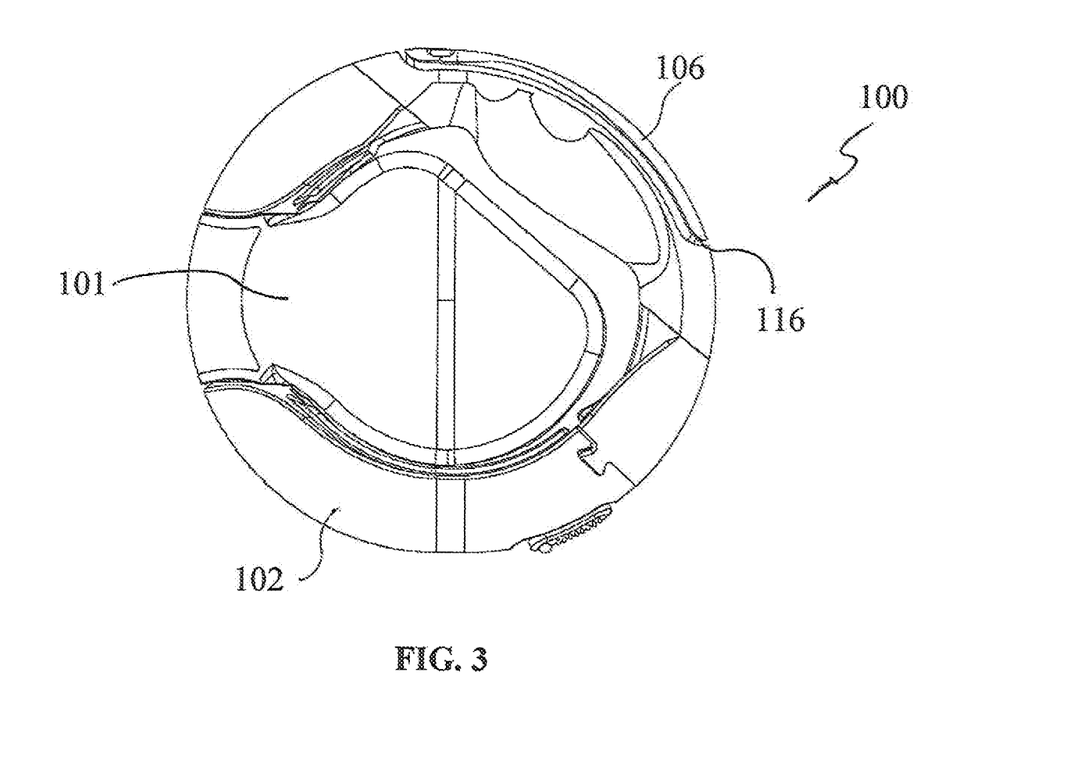
FIG. 3 is a front view of the leash of FIG. 1 in an inoperative condition.

In this way, as shown in FIG. 3, the shell 101 may be completely contained inside the handle 102 to be stored occupying a reduced volume substantially corresponding to the volume of the toroidal handle.

Figure 4:
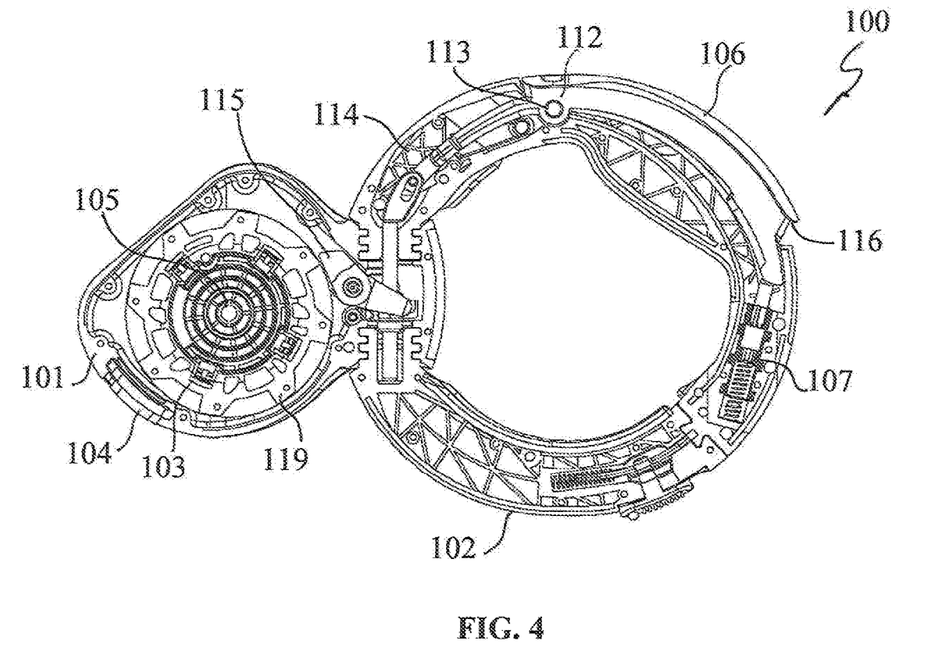
FIG. 4 is a front view of the leash of FIG. 1 partially open to allow the vision thereinside and wherein the leash is in the condition wherein the cable is free to be unrolled by the animal pulling or rewound through the spring.

From FIG. 4 you can see that the shell 101 contains inside a cable-winding roll 103 around which a cable or tape, not shown, will may be rolled up, having an end integral with the roll 103 and a free end external to the shell 101 and coming out through an opening 104 thereof to be hooked to a collar, vest or other item wearable by the animal. In a known way, the roll 103 is rotatable around a rotation axis as a result of the action of a spiral spring 105 housed in an appropriate seat inside the cable-winding roll 103, so to be coaxial thereto.

In turn, the handle 102 houses locking/unlocking means of the roll provided with a control mechanism operated through the palm of the hand to move from an unlocking position in which the roll 103 is free to rotate to allow the unrolling and the winding of the cable, respectively as a result of the pulling action of the animal and of the recall effect of the spiral spring 105, and a locking position of the cable 103 wherein the cable is locked.

Figure 5:
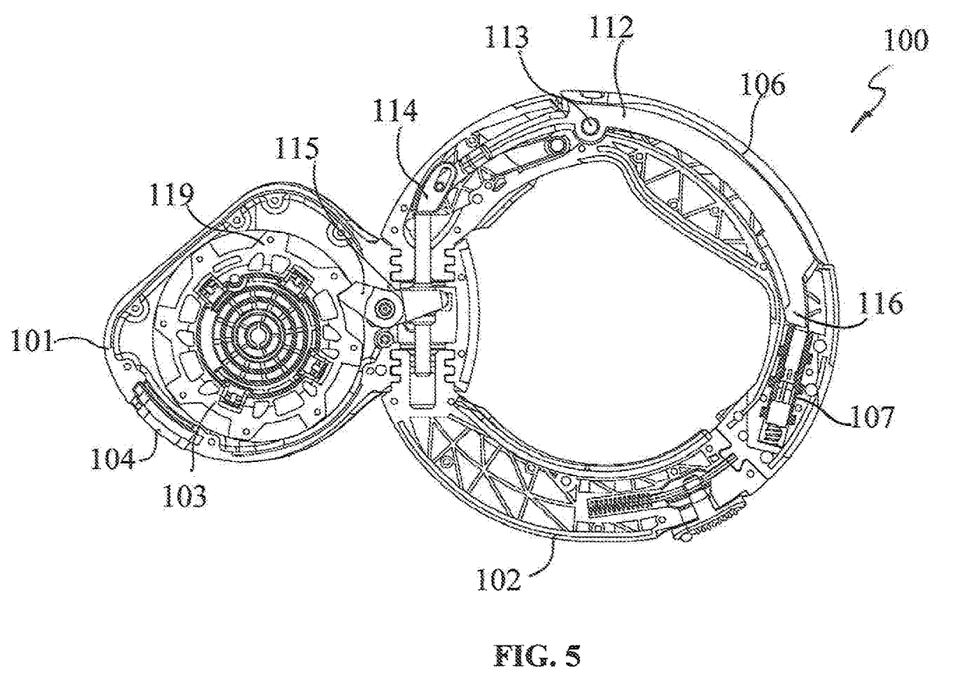
FIG. 5 is a front view of the leash of FIG. 1 partially open to allow the vision thereinside and wherein the leash is in a condition in which the cord is locked.

In particular, FIG. 4 shows the lever 106 in the locking position of the cable while in FIG. 5 the lever 106 is shown in a locking position.

Moreover, the first lever 106 is associated to a bi-stable locking device 107, commonly known as "push-push", suitable for keeping it locked in one of the two positions preventing it from returning automatically to the other position once upon the end of the pressure exerted by the palm of the hand and allowing the passage from the locking position to the unlocking position and vice versa only after a new pressure.

The bi-stable locking device 107 is shown in a more detailed way in the FIGS. from 7 to 10, from the which it is observed that the bi-stable device 107 comprises a snap mechanism provided with a slider 108 slidable in guide cylinder 109 fixed housed in the handle 102 and suitable to engage, as a result of a predetermined minimum stroke, a stop pin 110 provided with cam means adapted to transform the rectilinear sliding movement of the slider 108 into rotation movement.

Figure 6:
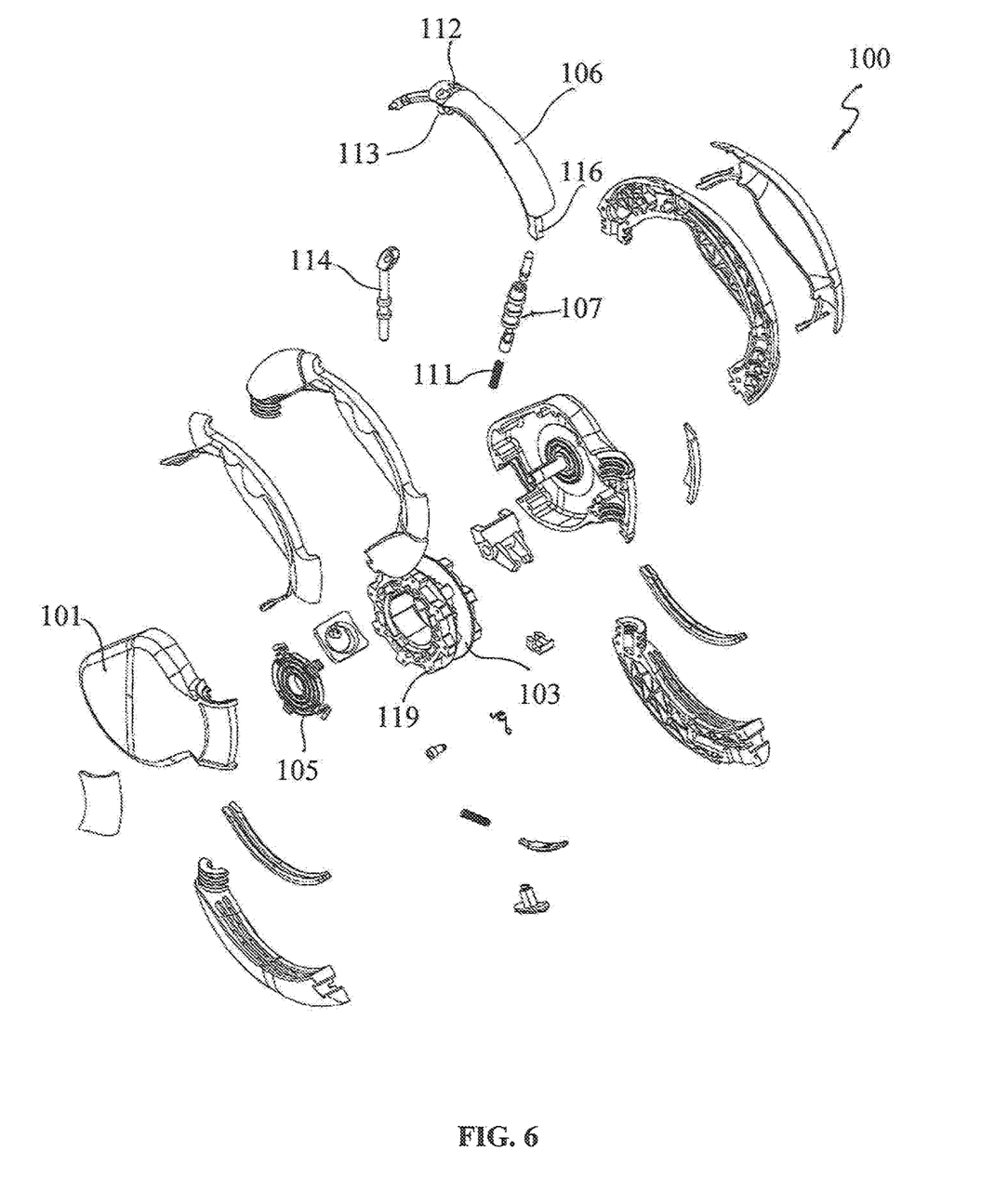
FIG. 6 is a perspective exploded view of the leash of FIG. 1.
Figure 7:
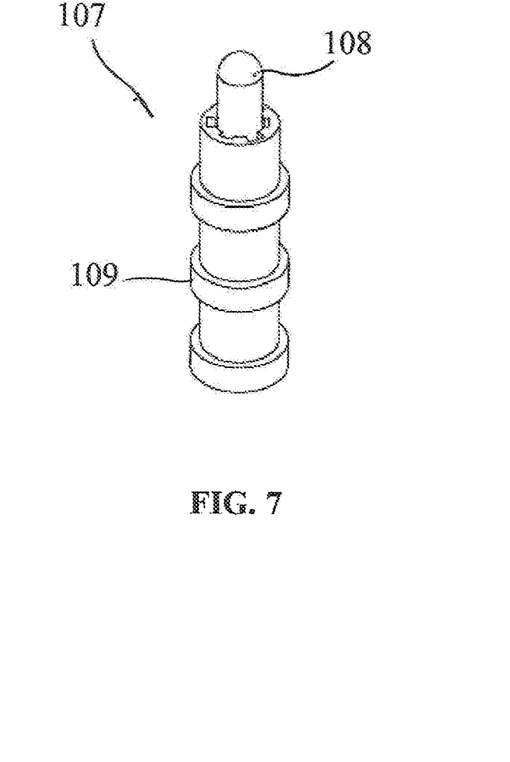
FIG. 7 is a perspective view of a first detail of the leash of FIG. 1.
Figure 8:
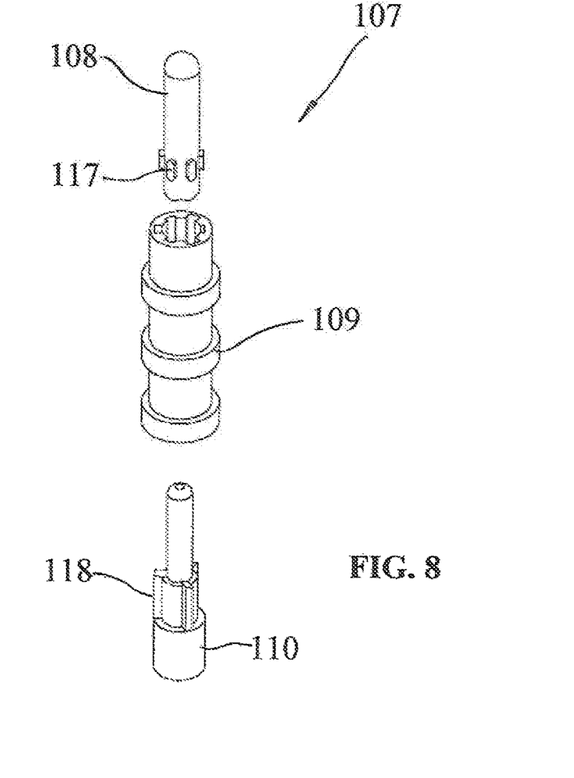
FIG. 8 is an exploded view of the detail of FIG. 7.
Figure 9:
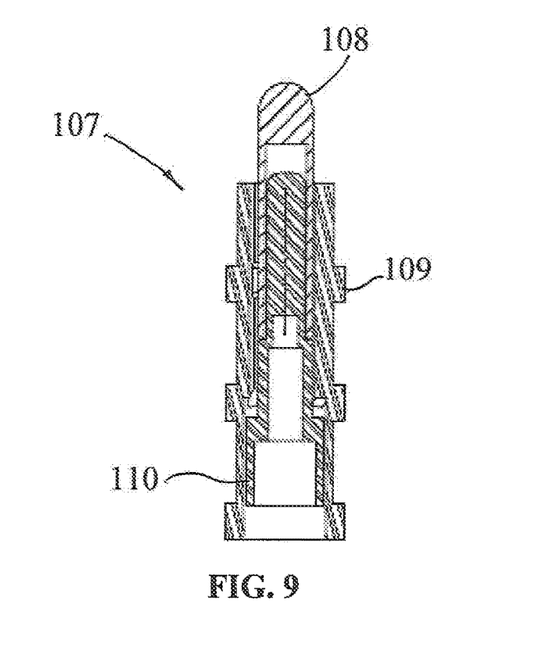
FIG. 9 is a cross-sectioned view of the detail of FIG. 7 corresponding to the condition of the leash of FIG. 4.
Figure 10:
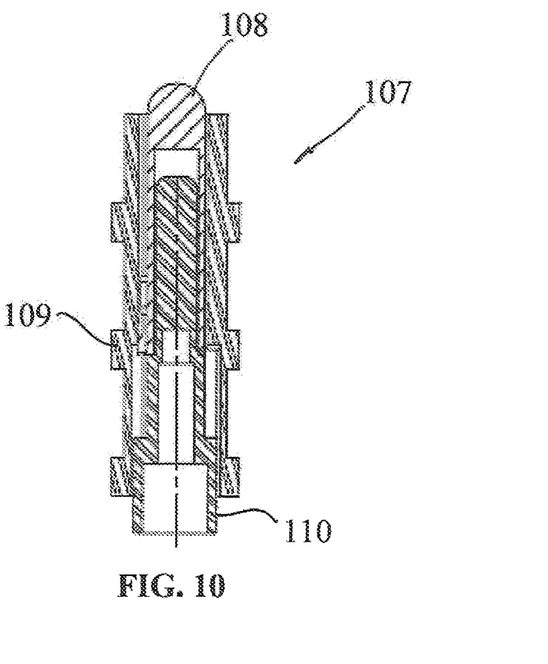
FIG. 10 is a cross-sectioned view of the detail of Fig. corresponding to the condition of the leash of FIG. 5.

The stop pin is also provided with a helicoidal spring 111, visible in the exploded view of FIG. 6, pre-charged to promote the return of the slider 108 towards the unlocking position.

The first lever 106 has a first end 112 fulcred on a pin 113 fixed in the handle 102 to rotate therearound as a result of a pressure exerted through the palm and which is connected through a lever mechanism 114 to a hook adapted to engage the cable-winding roll 103 as a result of a rotation promoted by the lever mechanism 114 as a result of the passage of the first lever 106 from the unlocking position to the locking position, so to block the rotation of the cable-winding roll 103.

Moreover, the first lever 106 has a second end provided with a nose 116 integral with the bi-stable device 107 so that it is locked in the position determined by the slider 108. In this way, to lock the cable it will be sufficient to push the first lever 106 by the palm so that the nose 116 of the lever 106 operates on the lever 108 and makes it translate.

However, the bi-stable device 107 will be shaped so that for a first length of its stroke, lower than the minimum stroke, the slider 108 does not stop on the stop pin 110 but produces a partial rotation of the hook 115 such as this one engages the cable 113 in an unstable way, or in such a way that as a result of the release of the first lever 106 both the hook 115 and the slider 108 may return automatically to the unlocking position. In consequence of a translation for a stroke at least equal to the minimum predetermined stroke, the slider 108 will engage with its projections 117 the cam means defined by the inclined planes 118 of the stop pin 110 to rotate around its axis and to be brought in the locking position.

This position will correspond to the maximum rotation of the hook 115 which will engage one of the outer peripheral teeth 119 of the cable-winding roll 103 in such a way that it can prevent it from rotating both in winding or in unwinding direction.

The bi-stable device 107 will prevent, without pressure by part of the hand, the first lever 106 from returning to the unlocking position.

In order that this happens it will be necessary to push again the lever 106 with the palm so to unlock the slider 108 and promote newly the return to the unlocking position under the action of the torsion spring 111.

According to a particular variant, the leash 100 may comprise a temporary locking device 120 of the arranged at the opening 104 of the shell 101.

Figure 11:
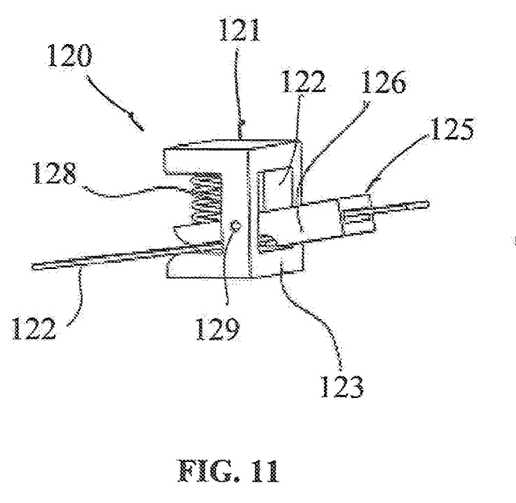
FIGS. 11 and 12 are perspective views of a second detail of the leash in two different operative conditions.
Figure 12:
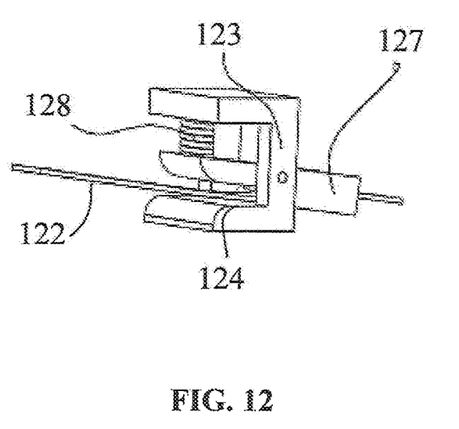

The temporary locking device 120, shown in a more detailed way in FIGS. 11 and 12, comprises a locking element 121 susceptible of rotating as a result of the only rotation of the handle 102 from a first position wherein the sliding of the cable 122 is free to a second position wherein the locking element 121 holds the cable 122 to prevent it from sliding.

In particular, FIGS. 11 and 12 show the device 120 respectively in the locking phase and in the sliding step of the cable 122.

The locking element 121 comprises a guide body 123 located at the opening 104 for the exit of the cable 122 and having a sliding surface 124 for the cable 122 and a second lever 125 pivoted on the guide body 123.

The second lever 125 is characterized by a solid portion 126 and a hollow portion 127 wherein the cable slides 122 and it is free to rotate around a fulcrum axis from this first position lifted with respect to the sliding surface 124 and the second position wherein the second lever 125 blocks the cable 122 on the sliding surface 124.

Moreover, the second lever 125 has a first end portion associated to an elastic preloaded element 128 adapted to exert a recall force towards the raised first position.

The operation of the temporary locking device 120, which happens by the simple rotation of the wrist, allows to obstruct the passage of the cable 122.

Figure 13:
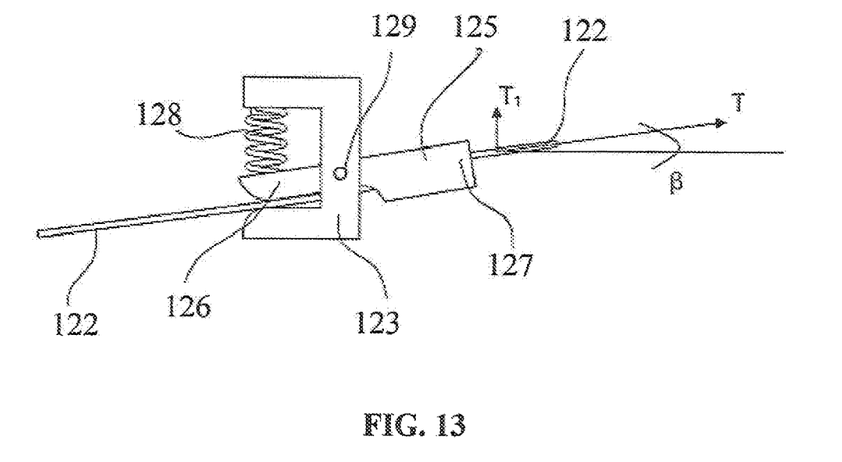
FIG. 13 is a front view of the second detail of FIG. 11.

With reference to FIG. 13, the direction and the way of sliding of the cable 122 during elongation, when the animal is allowed to go away from the owner, are indicated by the vector T of the pulling force of the animal.

In such device the sliding of the cable 122 is avoided by the front solid portion 126 of the second lever 125, which blocks the cable 122 as a result of the component T1 perpendicular to the plane α of the pulling force T exerted by the animal along the cable, when the leash is rotated with an angle β with respect to the same plane α.

The component T1 obliges the lever 125 to rotate around the pin 129. The crushing force exerted by the front portion of the lever 125 is suitable for locking the cable 122 and will be as greater as greater is the angle β because the component T1 will be greater, and as longer will be the hollow portion 127 of the second lever 125, equal to the distance between the fulcrum pin 129 and the opening for the cable 122.

The rotation angle β between the plane α and the pulling direction along the cable 122 is obtained only by rotating the wirst. When the force T is absent, the recall spring 128 obliges the front portion 126 of the lever 125 to rotate upwards making free the slid of the cable 122.

The temporary locking device 120 provide first of all the advantage of not requiring the use of any finger of the hand and the application of any force thereby, the locking action being carried out through the force exerted by the pulling of the animal as a result of the simple rotation movement of the wrist, so as to cause the rotation β of the leash with respect of the pulling direction of the animal.

The application of the device 120 to the extensible leash and the dynamics through which the lever 125 operate correspond to an instinctive recall movement of the animal by the owner, who, in case of need, recalls the animal bringing near him the leash and with this movement promoting its rotation.

According to a particular variation the leash will be adapted to be provided with such temporary locking device 120 associated to common locking/unlocking means, or without the above mentioned first lever 106.

Figure 14:
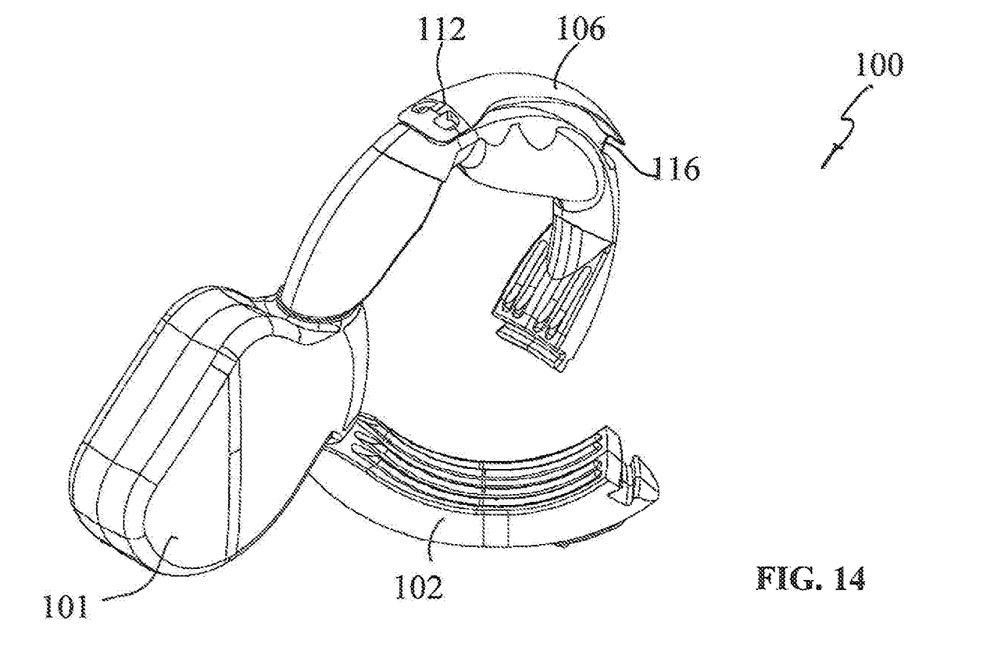
FIG. 14 is a perspective view of the leash of FIG. 1 wherein the handle is partially open to allow its positioning around a pole or another anchorage element.

FIG. 14 shows that the toroidal handle 102 may be opened in a way similar to what described in the already mentioned WO2011058588 to which reference is made for a greater description. However, the handle can also be not openable.

Figure 15:
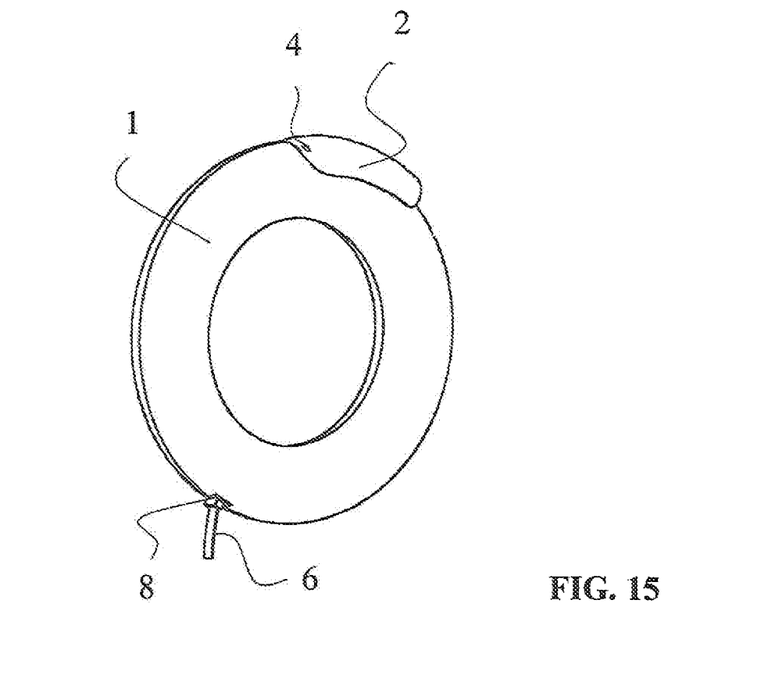
FIG. 15 is a perspective view of the leash in a second configuration.
Figure 16:
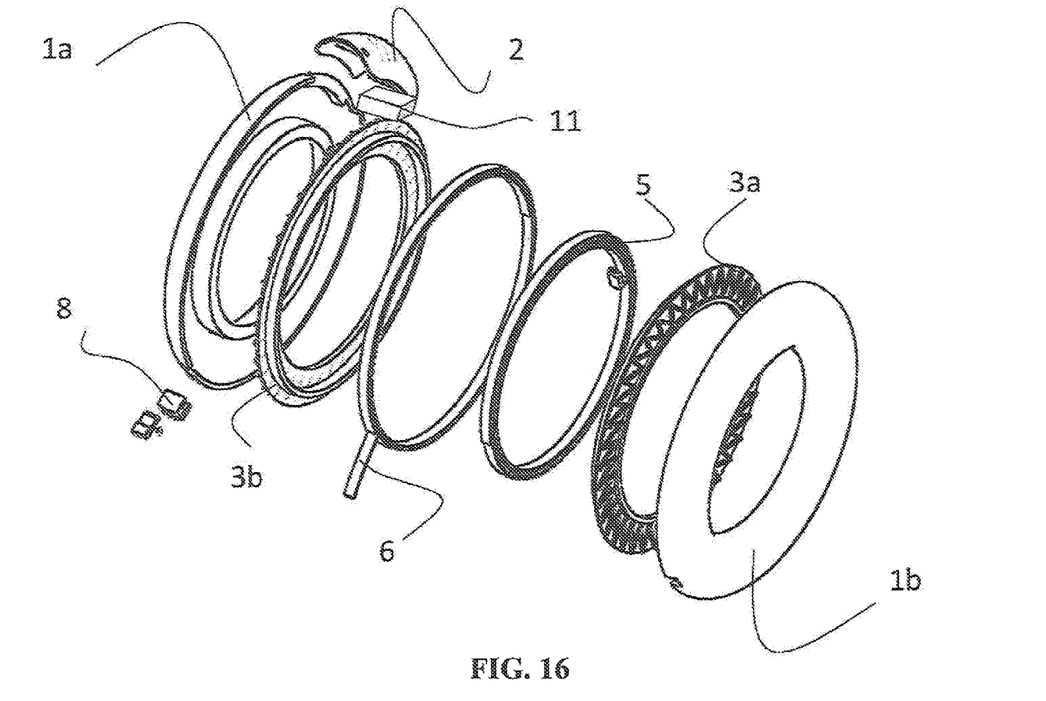
FIG. 16 is a perspective exploded view of the leash of FIG. 15.
Figure 17:
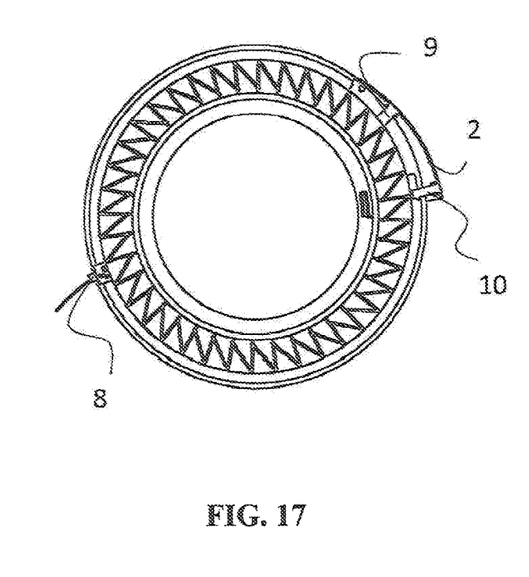
FIG. 17 is a front view of the leash of FIG. 15 partially open to allow the vision thereinside and wherein the cable is unlocked.
Figure 18:
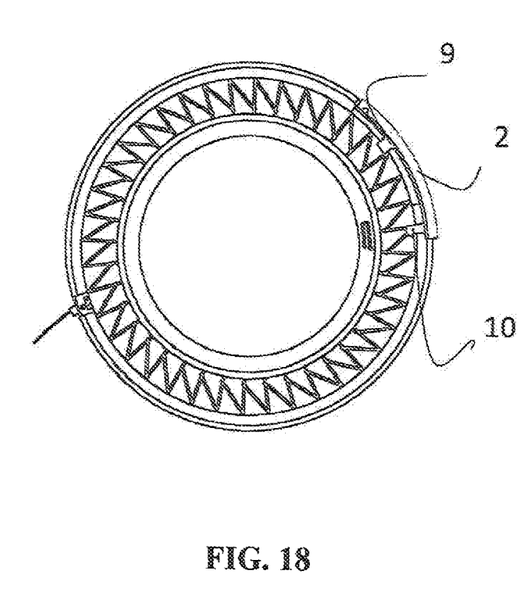
FIG. 18 is a front view of the leash of FIG. 15 partially open to allow the vision thereinside and wherein the cord is locked.
Figure 19:
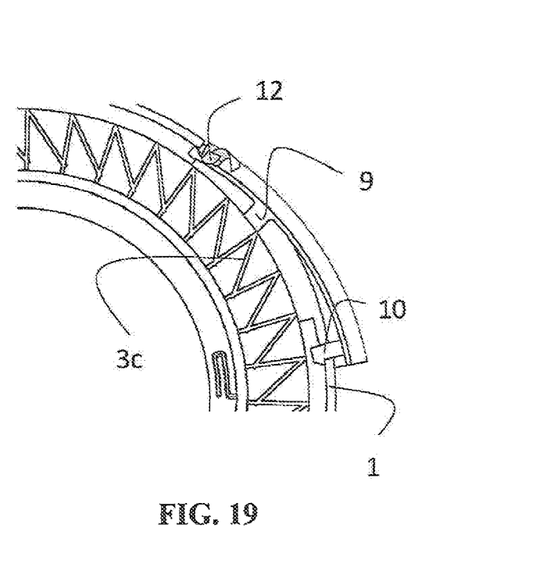
FIG. 19 is an enlarged view of a first detail of the leash of FIG. 15 in the condition of FIG. 17.
Figure 21:
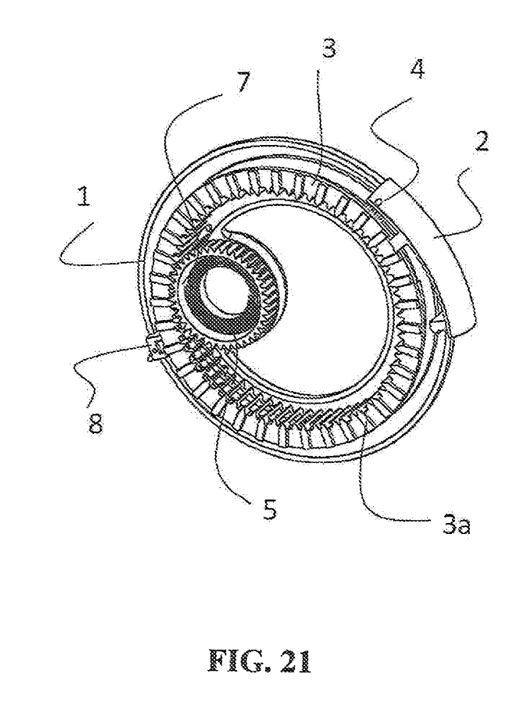
FIG. 21 is a perspective view of a leash in a third embodiment partially open to allow the vision thereinside.
Figure 22:
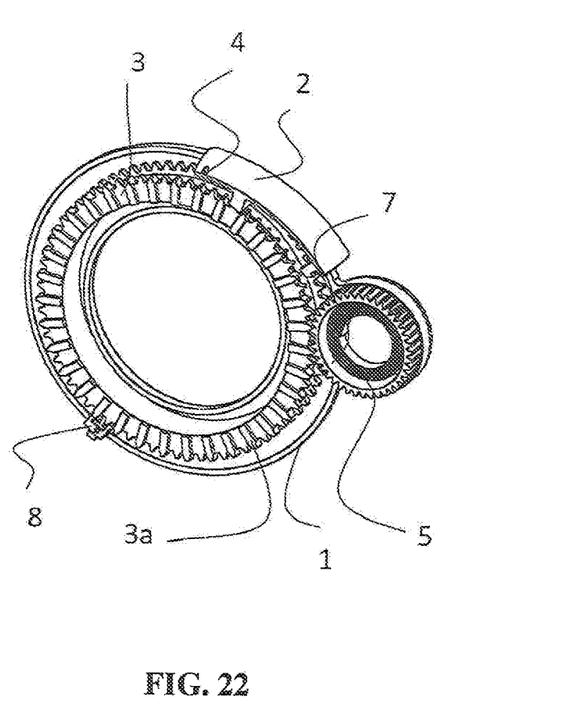
FIG. 22 is a perspective view of a leash in a forth embodiment open to allow the vision thereinside.

FIGS. 15, 21 and 22 show three further embodiments sharing the presence of a toroidal-shaped shell 1 defining also the handle and having inside the cable-winding roll 3.

A first embodiment, represented by configuration of FIG. 15, provide that the seat for spiral spring 5 is inside the cable-winding roll 3. The other two embodiments of FIGS. 21 and 22 provide instead that the seat of the spiral spring 5 is in an appropriate spring-holder roll 7.

In the last two embodiments the spring-holder roll 7 is located outside the cable-winding roll 3 and it is bring into rotation by a mechanical transmission, represented, in a preferred but not exclusive way, by cogwheels 13, 14 arranged on the cable-winding roll 3 and on the spring-holder roll 7 respectively, more precisely on the outer peripheral circumference of the spring-holder roll 7 and on the external circumference of the cable-winding roll 3 for the embodiment of FIG. 21, tangent to the outer diameter of the cable-winding roll 3, or on the inner circumference of the cable-winding roll 3, tangent to the inner diameter thereof, for the embodiment of FIG. 22.

For these last two embodiments, it is noticed that the rotation of the spring-holder roll 7 is caused by the rotation of the cable-winding roll 3. Such mechanism of transmission allows the rotation of the spring-holder roll 7 which, according to the sense of rotation, allows the spring 5 contained internally to be charged, accumulating elastic energy during the elongation of the cable, or to release elastic energy which turns into kinetic energy during the winding of the cable 6.

The three embodiments are characterized in that the cable-winding roll 3, the spring-holder roll 7 and the locking/unlocking means are all closed inside two half-shells 1a, 1b assembled each other to form the outer shell 1.

The shell 1 defines a hollow toroidal-shaped handle having circular section and with a diameter proportionate to the dimensions of the hand and having a lever 2 located on the handle.

In each of the three embodiments the handle 1 is made up of two half-shells 1a, 1b appropriately shaped so to contain the cable-winding roll 3 and spring-holder roll 7, and to allow the introduction and the movement of the lever 2 pivoted on the rotation pin 4 and so shaped to have inside it the bi-stable or "push-push" device 11 for locking/unlocking the cable-winding roll 3.

The lever 2 is free to rotate around the rotation pin 4 so that when the user catches the handle 1 the fingers place themselves along the inner diameter of the torus while the palm is placed on the lever 2.

The pressure on the lever 2 is exerted by the user while clenching the first so to oblige the lever 2 to rotate around the pin 4 from the outside to the inside of the handle.

Such rotation of the lever causes the nose 9 of the lever 2 to interfere, contrasting, with the teeth 3c placed in relief on both the external sides of the cable-winding roll 3. As a result of this opposition the cable-winding roll 3 is locked in the actual position and cannot let the cable 6 come out under the pulling action of the animal.

The helicoidal spring 12 placed inside the lever 2 is set with a certain pre-charge on the rotation pin 4 and carries out an action which pushes the lever 2 externally and keeps the tooth 10 of the lever 2 abutting against the handle 1.

Figure 20:
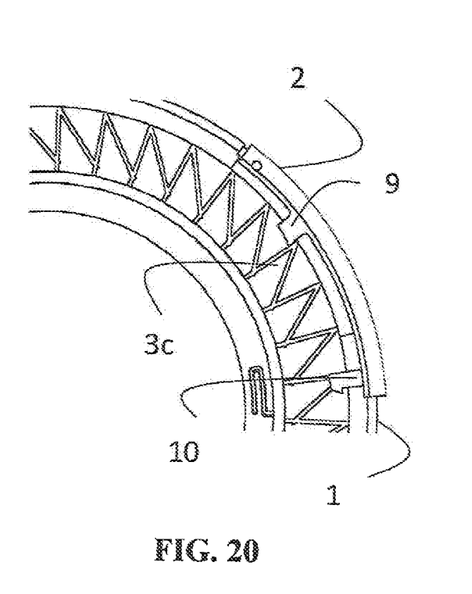
FIG. 20 is an enlarged view of the first detail of the leash of FIG. 15 in the condition of FIG. 18.

The lever 2, under the pressure exerted by the palm, is brought toward the inner working position, shown in FIG. 20 and stays in such position, in spite of the reaction of the spring 12, as a result of the bi-stable or "push-push" device 11 with which the lever 2 is integral.

From above it is evident that the leash according to the invention reaches the intended objects.

The leash according to the invention is susceptible of many changes and variations, all about the inventive concept expressed in the attached claims.

All the details may be replaced by other technically equivalent elements, and the materials will be different according to the requirements, without departing from the aim of protection of the present invention.

The invention claimed is:

1. An extensible leash for pets, comprising:
   a shell (1, 101) provided with a handle (1, 102);
   a cable-winding roll (3, 103) housed in said shell (1, 101) and provided with a cable (6, 22) with an end integral with said roll (3, 103) and a free end external to said shell (1, 101) and sliding through an opening (104) of said shell (1, 101) to be hooked up to a collar, a vest or any other item wearable by the animal, said roll (3, 103) being rotatable around a rotation axis as a result of the action of a spiral-shaped spring (5, 105) into said shell (1, 101);
   means for locking/unlocking said roll provided with a control mechanism operated by a first lever (2, 106) arranged on said handle (1, 102) in such a position as to be operated by the palm of the hand to move from an unlocking position wherein said roll (3, 103) is free to rotate to a locking position of said roll (3, 103);
   said first lever (2, 106) is associated with a bi-stable locking device (11, 107) adapted to hold said first lever locked in the locking and unlocking positions and to allow said first lever to move from the locking position to the unlocking position and vice versa only after a further pressure of said first lever (2, 106);
   wherein said bi-stable locking device comprises a snap mechanism provided with a slider slidable in a fixed guide cylinder and adapted to engage, after a predetermined minimum stroke, a stop pin provided with cam means adapted to turn a rectilinear sliding movement of said slider into a rotation movement.

2. Leash according to claim 1, characterized in that said first lever (2, 106) has a first end pivoted on said handle to rotate around a pin (4, 113) and a second end (9, 116) adapted to interacting with said bi-stable device (11, 107).

3. Leash according to claim 2, characterized in that said pivoted end of said first lever (2, 106) is connected to a lever mechanism, provided with a hook (115) adapted to engage said cable-winding roll (3, 103) as a result of a rotation promoted by said lever mechanism (114) due to the passage of said first lever (2, 106) from the unlocking position to the locking position to lock the rotation of said roll (3, 103).

4. Leash according to claim 1, characterized in that said stop pin (110) is provided with a pre-charged spring (111) to promote a return movement of said slider (107) toward said unlocking position.

5. Leash according to any previous claim 1, characterized by comprising a temporary locking device (8, 120) of said cable (6, 120) housed at the opening of said shell (1, 101).

6. Leash according to claim 5, characterized in that said temporary locking device (8, 120) comprises a locking element (121) susceptible of rotating as a result of a rotation of said handle (1, 102) from a first position wherein the sliding of said cable (6, 120) is free to a second position wherein the locking element (121) holds said cable (6, 120) to prevent said cable from sliding.

7. Leash according to claim 6, characterized in that said locking element (121) comprises a guide body (123) arranged at said opening (104) and with a sliding surface (124) for said cable (6, 120) and a second lever (125) pivoted on said guide body (123) and with a cavity for the passage of said cable (6, 120), said second lever (125) being free to rotate around a fulcrum axis (129) from said first position raised with respect of said sliding surface (124) and said second position wherein said second lever (125) locks said cable (6, 120) on said sliding surface (124).

8. Leash according to claim 7, characterized in that said second lever (125) has a first portion associated with an elastic pre-charged element (128) adapted to exert a recall force towards said raised first position.

9. Leash according to claim 1, characterized in that said spiral spring (5, 105) is housed in concentric position inside said cable-winding roll (3, 103).

10. Leash according to claim 1, characterized in that said spiral spring (5, 105) is housed externally to said cable-winding roll (3), inside a spring-holder roll (7).

11. Leash according to claim 10, characterized in that the movement and forces from said cable-winding roll (3) and said spring-holder roll (7) are transferred through a kinematic mechanism.

12. Leash according to claim 11, characterized in that said kinematic mechanism comprises a cogwheel gear (13, 14) wherein a cogwheel is located on said cablewinding roll (3) and the other on said spring-holder roll (7).

13. Leash according to claim 1, characterized in that said shell (1) has a toroidal tubular closed shape to define said handle housing said rotatable cablewinding roll (3).

* * * * *